United States Patent [19]

Michel

[11] Patent Number: 4,575,127

[45] Date of Patent: Mar. 11, 1986

[54] MEDICAL DATA CARD HAVING INTERNAL ILLUMINATION

[75] Inventor: Thomas J. Michel, Miami, Fla.

[73] Assignee: Data Medi-Card, Inc., Lake Worth, Fla.

[21] Appl. No.: 692,702

[22] Filed: Jan. 18, 1985

[51] Int. Cl.[4] .......... B42D 15/00; B32B 7/00; B32B 3/00

[52] U.S. Cl. .......... 283/109; 428/203; 428/204; 283/900

[58] Field of Search .......... 283/76, 105, 107, 109, 283/74; 428/13, 204, 203, 209, 210, 912.2, 916; 40/2.2

[56] References Cited

U.S. PATENT DOCUMENTS

| | | | |
|---|---|---|---|
| 3,896,726 | 7/1975 | Staats | 283/109 |
| 4,187,628 | 2/1980 | Thompson | 428/13 |
| 4,318,554 | 3/1982 | Anderson et al. | 283/109 |
| 4,499,126 | 2/1985 | Suzuki et al. | 428/204 |
| 4,519,155 | 5/1985 | Gallagher et al. | 428/203 |

*Primary Examiner*—Paul A. Bell
*Assistant Examiner*—Paul M. Heyrana, Sr.
*Attorney, Agent, or Firm*—Michael Ebert

[57] ABSTRACT

An internally-illuminated medical data card in a credit card format containing a summary of the medical history of the bearer germane to his existing medical condition. The card, which is of laminated construction, includes a core panel formed by front and rear plastic sections having light-transmitting properties, a metallized layer functioning as a double-faced mirror being sandwiched therebetween. Nested in the respective faces of the core sections are front and rear film transparencies containing medical data in a directly legible scale, the combined data affording the required summary. The long edges and one end of each core section are in a concave formation to define reflective convex terminations whereby light entering the remaining flat end is transmitted through the section is reflected by the convex terminations and by the mirror to provide multiple internal reflection, causing the light to illuminate the transparencies to enhance their readability.

4 Claims, 7 Drawing Figures

Fig. 1.
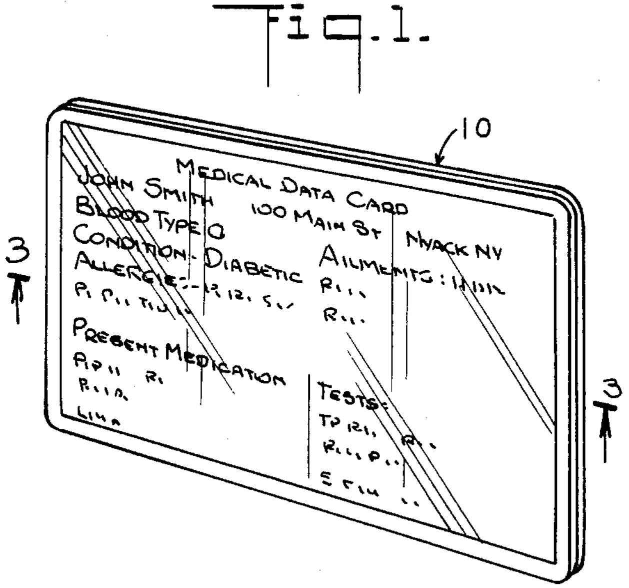
Fig. 4.
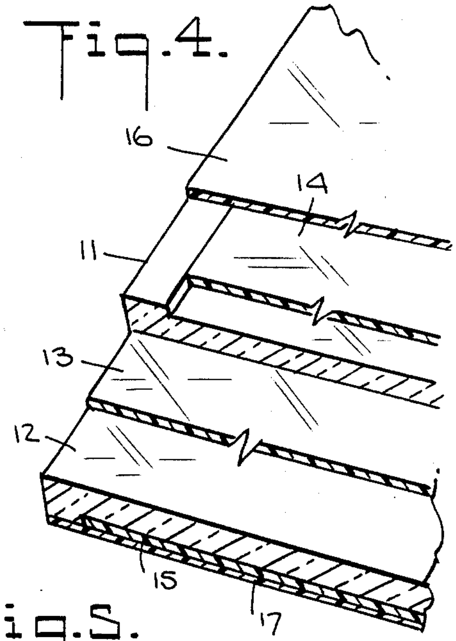
Fig. 2.
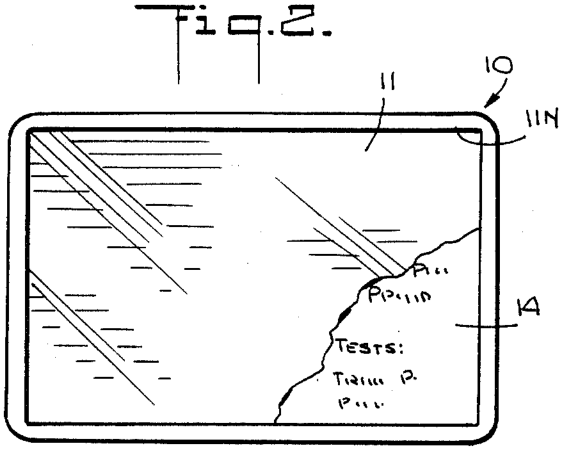
Fig. 5.
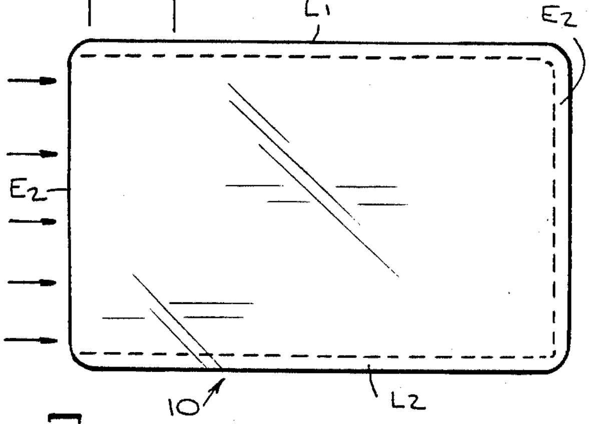
Fig. 3.
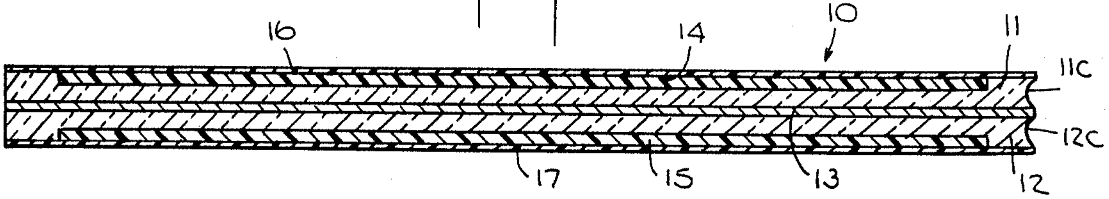
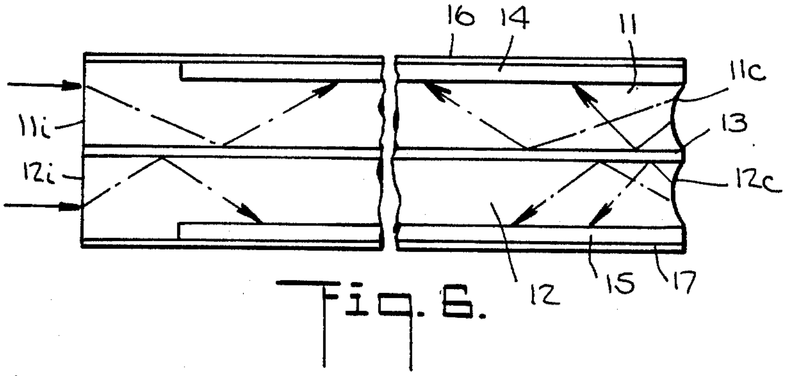
Fig. 6.
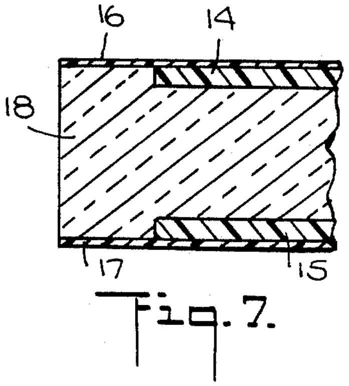
Fig. 7.

MEDICAL DATA CARD HAVING INTERNAL ILLUMINATION

BACKGROUND OF INVENTION

1. Field of Invention

This invention relates generally to a medical data card containing a summary of the medical history of the bearer germane to his existing medical condition, and more particularly to an internally-illuminated card of this type which is provided with front and rear transparencies affording a relatively large data capacity, the data carried thereby being legible and directly readable without the need for optical magnification.

2. Status of Prior Art

It is now known to provide an individual who has a serious medical condition with a medical data card in a plastic credit-card format. This card, which contains a summary of the individual's medical history to the extent that it is germane to his condition, is carried by the bearer at all times in a wallet or purse or elsewhere on the person where it is likely to be found should the person be searched.

The reason why certain individuals carry such medical data cards is that should they fall victim to a heart seizure, a pulmonary attack or to some other reaction which renders the bearer incoherent or unconscious, then the card may be consulted to expedite emergency medical treatment.

Under ordinary circumstances, should an individual who has a serious medical problem suffer from an attack when away from home, he will, if he is fortunate, be rushed to a nearby physician or to the emergency facility at the nearest hospital. But since the attending physician has not previously seen the patient, in the absence of a medical data card the doctor has no information regarding the medical history of the patient. This makes a rapid and accurate diagnosis difficult to carry out, and may in some instances lead to an erroneous judgment; for if the patient had been under medication, the prescribed drugs may so effect biological functions as to mask the patient's condition and mislead the diagnostician.

To assist an attending physician in an emergency situation of this type, some hospitals now issue a medical data card in a credit card format to be carried at all times by an outpatient, the card providing data pertinent to the medical condition of the patient, such as blood type, allergies and present medication.

In order to compress all necessary medical history data on a single card, existing cards of this type include a microfilm frame in which the data appears on a transparency in an optically-reduced scale, the frame being held within an aperture or window cut into the card.

Hence the data is not legible and directly readable and can only be read with the aid of an ophthalmoscope, an otoscope, a low-powered magnifier and whatever other optical magnification equipment is available at the facility at which the patient is being treated. Because not all physician's offices or hospital emergency rooms are equipped with optical magnification devices, one known type of medical data card produced by the U.S. Medicom Corporation provides a microfilm frame in which some of the significant or critical data is reproduced in a relatively large scale so that it can be read without optical assistance in an emergency situation, the remaining data being in a sharply-reduced scale.

The patent to Destal, U.S. Pat. No. 3,180,043, shows a card which is in a size that fits into a wallet and includes a microfilm frame mounted in a window, the frame carrying identification data in a reduced scale. A similar card is disclosed in the patent to Cohen, U.S. Pat. No. 3,792,542, in which the data appearing on the microfilm is critical medical data. In order to read microfilm data on a card, the patent to Goss et al., U.S. Pat. No. 3,117,608, provides a foldable extension supporting a small magnifying lens.

The patent to Brech, U.S. Pat. No. 4,259,391, shows a plastic medical card in which some of the data is so printed as to be directly readable, most of the data being in a reduced scale on microfilm. The fact that medical data on microfilm is not legible is recognized in the Anderson U.S. Pat. No. 4,318,554, which notes that medical data cards of this type are not readable by the human eye without optical viewer equipment. The need for a microfilm reader is also acknowledged in the Domo patent, U.S. Pat. No. 4,236,332, whose medical data card incorporates a microfilm frame.

In the Adrian U.S. Pat. Nos. 4,393,610 and 4,435,912, in order to avoid the need for a separate optical enlarger, the medical data card disclosed therein includes a foldable section provided with an enlarging lens, which section can be bent over to view the recorded microfilm data. As indicated by Adrian, in many cases the treating physician does not have any readily available means for reading microfilmed information and it is necessary, therefore, to couple such means to the card.

A good quality microfilm viewer adapted to enlarge a reduced-scale microfilm image on a medical data card and to project the magnified image on a viewing screen will afford highly readable data. But, unfortunately, a reader of this type is rarely available in an emergency facility. A small, low-cost lens coupled to a medical data card is, of course, better than nothing, but reading of the data with a small lens is quite difficult. Moreover, a card having a fold-in lens does not readily fit into the wallet in the manner of a credit card.

In the conventional medical data card, the microfilm frame held in an aperture in the card is a transparency in which all information is necessarily on one face thereof, thereby limiting the data capacity of the card to whatever information can be compressed by photographic reduction in the small area of the frame.

If one could be assured that in all instances a microfilm reader having a high-quality optical system would be available, then one could record all necessary or desirable data on the film slide in a sharply reduced scale without fear that the data, when magnified, would be so distorted optically that it would not be readable. But since in many instances an ordinary magnifying glass is all that is available, this limits the degree to which photographic reduction can be effected on a medical data card to provide readable results when the data is magnified.

SUMMARY OF INVENTION

In view of the foregoing, the main object of this invention is to provide a data medical card having front and rear transparencies or slides, each carrying medical data relevant to the bearer of the card in a directly readable scale, whereby the data is clearly legible without any optical magnification.

Also an object of this invention is to provide a card of the above type in which each transparency is back-illuminated to enhance its readability.

A significant feature of a medical data card in accordance with the invention is that its length and width dimensions correspond to those of a standard credit card; hence the card may be stored in a wallet.

More particularly, an object of this invention is to provide a card having a data-carrying film slide on both the front and rear faces thereof, each slide being mounted on a core panel having fiber optic properties a functioning to direct light therethrough.

Yet another object of this invention is to provide medical data cards for a large number of different bearers, each card deriving its information germane to a given bearer from a computer bank in which the medical histories of all of the card bearers are stored.

Briefly, stated, these objects are accomplished in an internally-illuminated medical data card in a credit card format containing a summary of the medical history of the bearer germane to his existing medical condition. The card, which is of laminated construction, includes a core panel formed by front and rear plastic sections having light-transmitting properties, a metallized layer functioning as a double-faced mirror being sandwiched therebetween. Nested in the respective faces of the core sections are front and rear film transparencies containing medical data in a directly legible scale, the combined data affording the required summary. The long edges and one end of each core section are in a concave formation to define reflective convex terminations whereby light entering the remaining flat end is transmitted through the section is reflected by the convex terminations and by the mirror to provide multiple internal reflection, causing the light to illuminate the transparencies to enhance their readability.

OUTLINE OF DRAWINGS

For a better understanding of the invention as well as other objects and further features thereof, reference is made to the following detailed description to be read in conjunction with the accompanying drawings, wherein:

FIG. 1 is a perspective view of a laminated medical data card in accordance with the invention as seen from the front face thereof;

FIG. 2 is a plan view showing the outer face of the front core panel;

FIG. 3 is a section taken in the plane indicated by line 3—3 in FIG. 1;

FIG. 4 is a cut-away perspective of the card showing the several plies thereof;

FIG. 5 is a schematic view of the card showing the edges and an end thereof which have a concave formation;

FIG. 6 schematically illustrates the manner in which the data transparencies are illuminated; and FIG. 7 illustrates, in section, a simplified version of the data card.

DESCRIPTION OF INVENTION

Referring now to FIGS. 1 to 3, there is shown a medical data card in accordance with the invention, generally designated by numeral 10. The overall dimensions of the card are close to those of a standard credit card so that it may be concealed in a wallet, a pocket, or elsewhere on the person. Or one may provide an eyelet in the data card and suspend it from the neck by a chain in the manner of a military dog tag.

The card includes a core panel composed of identical front and rear sections 11 and 12 of thin transparent, synthetic plastic sheet material having fiber optic properties, between which is sandwiched a layer 13 of a reflective metal acting as a double-faced mirror.

This layer may be formed by the vacuum deposition of aluminum or silver on the inner face of one of the core sections and then laminating this section to the other core section by means of a clear adhesive of epoxy bonding agent. Or the double-faced mirror may be formed by an aluminum or silver foil having a thickness no greater than about two or three mils, the foil being laminated to the inner faces of the core sections by a clear adhesive.

In molding each core section, a shallow, rectangular depression or well 11N is formed in the outer face thereof. This well is dimensioned to snugly accommodate a 70 MM film transparency or slide which occupies almost the entire outer face of the core section. Thus nested in the outer face of front core section 11 is a front transparency 14, and in the outer face of rear core section 12 is a rear transparency 15. In practice, the transparencies may be bonded to the sections by the core panel by a clear adhesive. Protectively sealing in the transparencies to prevent scratching or mutilation thereof are clear polyester cover sheets 16 and 17, respectively, which are preferably of Mylar or similar material. In practice, one may also use a Polaroid transparency having a 3.25"×4.25" size.

The identity of the patient, his address, social security number and other identifying data preferably appear on the front transparency which also contains the most critical data in regard to the bearer of the card, such as his cardiac condition, the fact that he is a diabetic or suffers from emphysema or some other chronic disease. All of the medical history of the bearer that is germane to his condition, including his allergies and the medication he is currently taking, as well as EKG graphs in reduced form may be photographically included in the front and rear slides which together provide all vital background information needed in a medical emergency under circumstances where the patient is unable to communicate with the doctor.

The scale of the data is such that it is directly readable without optical assistance. Thus, instead of compressing the data in a sharply-reduced scale on one small slide as in prior cards, the data is in a readable scale on two relatively large slides, use being made of almost the entire front and rear areas of the card for this purpose.

Most modern hospitals now have a computer which stores the medical history of all patients, making it possible to select from this data bank and to present on the screen of a CRT terminal that portion of the medical history of a given patient germane to his condition. In order to make medical data cards in accordance with the invention, the required 70 MM slides for each bearer may be obtained by setting up the information for each slide on the CRT terminal, and then photographing the display to obtain the slide and possibly a back-up copy for the file. In this way, it is also possible to quickly provide an updated card; for a card prepared, say, 3 months ago, may no longer reflect the existing condition of the patient.

The card has fiber optic properties. It is known that one can transmit light from one end of a long glass cylinder to the other without leakage, provided that the light strikes the wall of the cylinder with an angle of incidence greater than the critical angle for total internal reflection. In transmission, light travels through the cylinder in a zig-zag path of successive internal reflections. To convey light without reflection loss, it is necessary that the angle of incidence A exceed the critical angle as expressed by the equation $$\mathrm{Sin}\, A = N_2/N_1;$$

where $N_1$ is the refractive index of the transmission material and $N_2$ that of the outer medium which in the case of a glass cylinder is air.

It is also possible to guide light through a clear plastic panel formed of acrylic or other glass-like material, for the index of refraction of this material relative to that of air results in internal reflection. The present invention exploits the optical light guide characteristics of the plastic core panels to provide illumination for the transparencies bonded thereto.

In order to exploit the fiber optic properties of the core panels 11 and 12, the sections of the core panel are molded, as indicated in FIG. 5, so that their long edges $L_1$ and $L_2$ as well as one end $E_2$ have a concave formation, thereby creating reflective convex terminations. Thus in FIG. 3, it will be seen that one end of core sections 11 and 12 has a concave formation 11C and 12C, respectively.

These concavities are polished to define with respect to internal light, the convex reflecting terminations. The other end $E_1$ of the core sections is planar to define incident light inputs $\mathbf{11}_i$ and $\mathbf{12}_i$. Thus, natural light or artificial light as from a flashlight impinging on light inputs $\mathbf{11}_i$ and $\mathbf{12}_i$ of the core sections are transmitted thereby and undergo internal reflection, no light escaping from the reflecting mirrors 13 or from the convex reflecting terminations. The only outlet for the internally-reflected rays is through the slides 14 and 15; and because of the multiple internal reflections, these slides are back-illuminated to greatly enhance their readability. In practice, instead of convex reflecting terminations, the long edges and one end of the core sections may be metallized to provide mirror surfaces.

Thus, when an emergency arises and the card is taken from the patient and given to the treating physician, he can, by holding the card so that its flat end is adjacent a light source of any available type, readily read the card and obtain medical history data that will assist his diagnosis and treatment.

In practice, the card may be made in a simplified version, as shown in FIG. 7, where the slides 14 and 15 are applied to opposite faces a clear plastic core panel 18 which, because of internal reflection, provides some degree of back illumination, but not as much as is provided in the embodiment disclosed in FIGS. 1 to 6.

While there has been shown and described a preferred embodiment of a medical data card having internal illumination in accordance with the invention, it will be appreciated that many changes and modifications may be made therein without, however, departing from the essential spirit thereof.

I claim:

1. A medical data card in credit card format containing a summary of the medical history of the bearer germane to his existing medical condition, the card comprising:

A. a core panel having light transmitting properties;

B. a front slide containing medical data in a legible scale mounted on the front face of the panel; and C. a rear slide containing medical data in a legible scale mounted on the rear face of the panel, said core panel transmitting light incident thereto to back illuminate the slides said core panel being constituted by interlaminated front and rear sections having a double faced mirror layer sandwiched therebetween.

2. A data card as set forth in claim 1, wherein said layer is a metallized coating on one of said sections.

3. A data card as set forth in claim 1, wherein said layer is a metal foil.

4. A data card as set forth in claim 1, wherein each section has a well depressed therein in which the associated slide is nested.

* * * * *